(12) United States Patent
Yanagisako (10) Patent No.: US 9,084,129 B2
(45) Date of Patent: Jul. 14, 2015

(54) RADIO COMMUNICATION SYSTEM, BASE STATION, MOBILE STATION, RADIO COMMUNICATION METHOD

(75) Inventor: Yoshifumi Yanagisako, Tokyo (JP)

(73) Assignee: NEC CORPORATION, Tokyo (JP)

( * ) Notice: Subject to any disclaimer, the term of this patent is extended or adjusted under 35 U.S.C. 154(b) by 658 days.

(21) Appl. No.: 13/147,660

(22) PCT Filed: Jan. 29, 2010

(86) PCT No.: PCT/JP2010/051213
§ 371 (c)(1),
(2), (4) Date: Aug. 3, 2011

(87) PCT Pub. No.: WO2012/106836
PCT Pub. Date: Sep. 23, 2010

(65) Prior Publication Data
US 2012/0002650 A1      Jan. 5, 2012

(30) Foreign Application Priority Data
Mar. 16, 2009   (JP) .................................. 2009-062587

(51) Int. Cl.
| H04B 7/00 | (2006.01) |
| H04W 24/02 | (2009.01) |
| H04W 36/30 | (2009.01) |
| H04W 36/24 | (2009.01) |
| H04W 84/04 | (2009.01) |

(52) U.S. Cl.
CPC .............. *H04W 24/02* (2013.01); *H04W 36/24* (2013.01); *H04W 36/30* (2013.01); *H04W 84/045* (2013.01)

(58) Field of Classification Search
CPC ..... H04W 36/30; H04W 36/24; H04W 24/02; H04W 84/045
USPC .................................................. 370/328, 332
See application file for complete search history.

(56) References Cited

U.S. PATENT DOCUMENTS

2008/0146227 A1 *   6/2008   Wu ............................. 455/435.1
2008/0161009 A1 *   7/2008   Zhao et al. ................. 455/452.2

(Continued)

FOREIGN PATENT DOCUMENTS

| JP | 2000505251 A | 4/2000 |
| JP | 2005269109 A | 9/2005 |

(Continued)

OTHER PUBLICATIONS

International Search Report for PCT/JP2010/051213 mailed Apr. 27, 2010.

(Continued)

*Primary Examiner* — Jay P Patel
(74) *Attorney, Agent, or Firm* — Sughrue Mion, PLLC (57) ABSTRACT

The present invention is applied to a radio communication system having a mobile station and a plurality of base stations each of which communicates by a radio signal with a mobile station that is present in a cell of each of its own base stations. In the radio communication system of the present invention, each of the plurality of base stations has base station side control means that detects an IP address of a base station that is a sender of an interference signal from the radio signal if the radio signal received from a mobile station with which the own base station is communicating contains the interference signal, the IP address having been set to the interference signal.

30 Claims, 7 Drawing Sheets

(56) References Cited

U.S. PATENT DOCUMENTS

| | | |
|---|---|---|
| 2008/0263674 A1 | 10/2008 | Yao |
| 2009/0170542 A1* | 7/2009 | Chen et al. .................... 455/501 |
| 2010/0020808 A1* | 1/2010 | Delaney et al. .......... 370/395.52 |

FOREIGN PATENT DOCUMENTS

| | | |
|---|---|---|
| JP | 2007266785 A | 10/2007 |
| JP | 2008067121 A | 3/2008 |
| JP | 2008259057 A | 10/2008 |
| JP | 2008271081 A | 11/2008 |
| JP | 2009015616 A | 1/2009 |
| WO | 2007049547 A | 5/2007 |

OTHER PUBLICATIONS

Japanese Office Action for JP2011-504770 mailed on Sep. 18, 2012.
Ericsson, On Inter-cell Interference Coordination Schemes without/with Traffic Load Indication, 3GPP TSG-RAN WG1#50b R1-074444, Internet<URL: http://www.3gpp.org/ftp/tsg_ran/WGI RL1/TSGR1 50b/Docs/RI-074444.zip>, Oct. 2007, pp. 1-6.

* cited by examiner

RADIO COMMUNICATION SYSTEM, BASE STATION, MOBILE STATION, RADIO COMMUNICATION METHOD

TECHNICAL FIELD

The present invention relates to a radio communication system, a base station, a mobile station, and a radio communication method.

BACKGROUND ART

A radio communication system in which base stations having a cell radius as small as around 10 m, named Femto base stations, are arranged has recently been implemented so as to allow for radio communication in a poor reception area.

However, if Femto base stations are arranged as base stations, since the cell radius of each Femto base stations is small, they need to be densely arranged. If they are arranged in such a manner, base stations adversely interfere with neighboring base stations.

As a method that decreases interference between base stations, Patent Literature 1 discloses a technique in which the system side measures the interference of channels and assigns small interference frequencies to base stations.

As another method that decreases interference between base stations, Patent Literature 2 discloses a technique in which a base station receives information about spread codes that neighboring base stations use from a highly hierarchical station and selects a spread code other than those that the neighboring base stations use, namely a small interference spread code.

RELATED ART LITERATURE

Patent Literature

Patent Literature 1: JP 2000-505251 A
Patent Literature 2: JP 2007-266785 A

SUMMARY OF THE INVENTION

Problem to be Solved by the Invention

According to the techniques disclosed in the foregoing Patent Literatures 1 and 2, since each base station can be notified of neighboring base stations and their communication parameters (frequencies and spread codes) by the highly hierarchical station, each base station can decrease the interference between base stations based on the notified information.

However, in other words, since each base station cannot be notified of the neighboring base stations and their communication parameters unless such a highly hierarchical station is arranged, the interference between base stations cannot be decreased.

Thus, the techniques disclosed in Patent Literatures 1 and 2 cannot be applied to a radio communication system in which the function of a highly hierarchical station is delegated to each base station and thereby a highly hierarchical station is omitted such as the LTE (Long Term Evolution) system that has been recently proposed.

Thus, a first object of the present invention is to provide a radio communication system, a base station, a mobile station, and a radio communication method in which a base station can detect neighboring base stations not through a highly hierarchical station.

A second object of the present invention is to provide a radio communication system, a base station, a mobile station, and a radio communication method in which a base station detects communication parameters of neighboring base stations and knows communication parameters that have small interference.

Means that Solve the Problem

A first radio communication system of the present invention is a radio communication system having a mobile station and a plurality of base stations each of which communicates by a radio signal with a mobile station that is present in a cell of each of its own base stations, wherein each of said plurality of base stations has base station side control means that detects an IP address of a base station that is a sender of an interference signal from the radio signal if the radio signal received from a mobile station with which the own base station is communicating contains the interference signal, the IP address having been set to the interference signal.

A second radio communication system of the present invention is a radio communication system having a mobile station and a plurality of base stations that communicate by a radio signal with a mobile station that is present in a cell of each of its own base stations, wherein said mobile station has mobile station side control means that detects an IP address of a base station that is a sender of an interference signal from the radio signal if the radio signal received from a base station with which the mobile station is communicating contains the interference signal, the IP address having been set to the interference signal, and that transmits information of the detected IP address to the base station with which the mobile station is communicating, and wherein each of said plurality of base stations has base station side control means that receives the information of the IP address of the base station that is the sender of the interference signal, the information being transmitted from the mobile station with which each of the plurality of base stations is communicating.

A first base station of the present invention is a base station that communicates by a radio signal with a mobile station that is present in a cell of its own base station, comprising:

base station side control means that detects an IP address of a base station that is a sender of an interference signal from the radio signal if the radio signal received from a mobile station with which the base station is communicating contains the interference signal, the IP address having been set to the interference signal.

A second base station of the present invention is a base station that communicates by a radio signal with a mobile station that is present in a cell of its own base station, comprising:

base station side control means that receives information of an IP address of a base station that is a sender of an interference signal from the mobile station with which the base station is communicating if the radio signal transmitted to the mobile station with which the base station is communicating contains the interference signal.

A mobile station of the present invention is a mobile station that communicates by a radio signal with a base station, comprising:

mobile station side control means that detects an IP address of a base station that is a sender of an interference signal from the radio signal if the radio signal received from a base station with which the mobile station is communicating contains the interference signal, the IP address having been set to the interference signal, and that transmits information of the detected IP address to the base station with which the mobile station is communicating.

A first radio communication method of the present invention is a radio communication method of a radio communication system having a mobile station and a plurality of base stations each of which communicates by a radio signal with a mobile station that is present in a cell of each of its own base stations, comprising the step of:

detecting an IP address of a base station that is a sender of an interference signal from the radio signal if the radio signal received from a mobile station with which its own base station is communicating contains the interference signal, the IP address having been set to the interference signal.

A second radio communication method of the present invention is a radio communication method of a radio communication system having a mobile station and a plurality of base stations that communicate by a radio signal with a mobile station that is present in a cell of each of its own base stations, comprising the steps of:

detecting an IP address of a base station that is a sender of an interference signal from the radio signal if the radio signal received from a base station with which the mobile station is communicating contains the interference signal, the IP address having been set to the interference signal, and transmitting information of the detected IP address to the base station with which the mobile station is communicating, and receiving the information of the IP address of the base station that is the sender of the interference signal, the information being transmitted from the mobile station with which each of the plurality of base stations is communicating.

A third radio communication method of the present invention is a radio communication method of a base station that communicates by a radio signal with a mobile station that is present in a cell of its own base station, comprising the step of:

detecting an IP address of a base station that is a sender of an interference signal from the radio signal if the radio signal received from a mobile station with which the base station is communicating contains the interference signal, the IP address having been set to the interference signal.

A fourth radio communication method of the present invention is a radio communication method of a base station that communicates by a radio signal with a mobile station that is present in a cell of its own base station, comprising the step of:

receiving information of an IP address of a base station that is a sender of an interference signal from the mobile station with which the base station is communicating if the radio signal transmitted to the mobile station with which the base station is communicating contains the interference signal.

A fifth radio communication method of the present invention is a radio communication method of a mobile station that communicates by a radio signal with a base station, comprising the step of:

detecting an IP address of a base station that is a sender of an interference signal from the radio signal if the radio signal received from a base station with which the mobile station is communicating contains the interference signal, the IP address having been set to the interference signal, and transmitting information of the detected IP address to the base station with which the mobile station is communicating.

Effect of the Invention

In the first radio communication system, each of a plurality of base stations detects an IP address of a Femto base station that is a sender of an interference signal contained in a radio signal received from a mobile station with which each of the plurality of base stations is communicating.

In the second radio communication system, a mobile station detects an IP address of a base station that is a sender of an interference signal that is contained in a radio signal received from a base station with which the mobile station is communicating and notifies the detected IP address to the communicating base station.

Thus, an effect in which each of a plurality of base stations can detect a base station that is a sender of an interfere signal, namely a neighboring base station, not through a highly hierarchical station is obtained.

BEST MODES THAT CARRY OUT THE INVENTION

Next, with reference to the drawings, best mode embodiments of the present invention will be described.

In the following embodiment, although it is assumed that base stations are Femto stations, the present invention is not limited to such an assumption.

Figure 1:
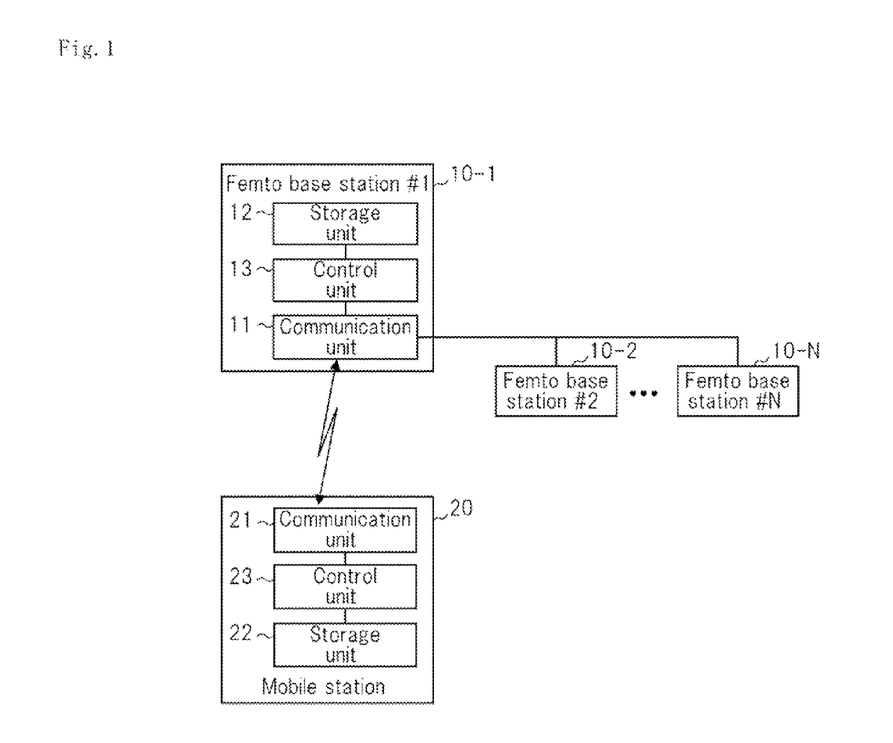
FIG. 1 is a block diagram showing the structure of a radio communication system according to a first embodiment of the present invention.

Referring to FIG. 1, a radio communication system according to this embodiment has N (where N is any natural number that is equal to or greater than two) Femto base stations 10-1~10-N and mobile station 20. In FIG. 1, for simplicity, although only one mobile station 20 is shown, the number thereof is not limited to one.

In this embodiment, each of Femto base stations 10-1~10-N detects neighboring base station and their communication parameters not through a highly peripheral station.

Thus, this embodiment can be applied both to a radio communication system having a radio network controller as a highly hierarchical station for Femto base stations 10-1~10-N such as a W-CDMA (Wideband-Code Division Multiple Access) system and to a radio communication system having Femto base stations 10-1~10-N to which the function of the radio network controller is delegated such as an LTE system.

Femto base stations 10-1~10-N are connected to a core network (not shown) and communicate with each other through the core network so as to detect neighboring base stations and their communication parameters.

Each of Femto base stations 10-1~10-N has communication unit 11, storage unit 12, and control unit 13. In FIG. 1, the internal structure of each of Femto base stations 10-2~10-N is omitted.

Communication unit 11 performs not only radio communication with mobile station 20 but also performs network communication with other Femto base stations 10 through the core network.

Storage unit 12 stores various types of information.

Control unit 13 controls communication unit 11 and storage unit 12 so as to perform various types of processes.

For example, control unit 13 performs the following processes.

a process that measures the interference amount of an interference signal contained in a radio signal by which own Femto base station 10 communicates with mobile station 20 through communication unit 11,
 a process that detects the IP address and port number of interference source Femto base station 10,
 a process in which interference source Femto base station 10 and own Femto base station 10 notify each other of communication parameters (IP address, port number, and so forth) of each of their own Femto base station and neighboring Femto base stations through communication unit 11,
 a process that creates a map that shows the communication parameters of the neighboring Fenno base stations and stores the map to storage unit 12,
 a process that reconstructs a cell based on the map and forcedly hands over mobile station 20 that is present in the pre-reconstructed old cell to a reconstructed new cell.

In addition, mobile station 20 has communication unit 21, storage unit 22, and control unit 23.

Communication unit 21 performs radio communication with each of Femto base stations 10-1~10-N.

Storage unit 22 stores various types of information.

Control unit 23 controls communication unit 21 and storage unit 22 so as to perform various types of processes.

For example, control unit 23 performs the following processes.

a process that measures the interference amount of an interference signal contained in a radio signal by which mobile station 20 communicates with Femto base station 10 through communication unit 21,
 a process that detects the IP address and port number of interference source Femto base station 10,
 a process that notifies communicating Femto base stations 10 of the ID address and port number of interference source Femto base stations 10.

Next, the operation of the radio communication system according to this embodiment will be described.

(1) Map Creating Operation

Each of Femto base stations 10-1~10-N creates a map that shows communication parameters of neighboring Femto base stations. Here, three examples of the operation that creates a map will be described.

(1-1) Example 1 of Map Creating Operation

Figure 2:
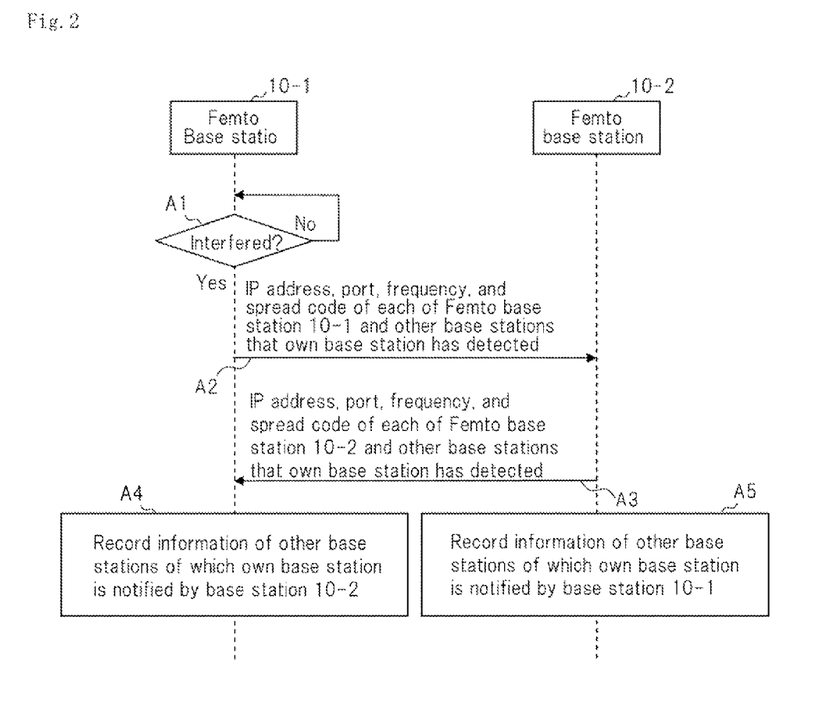
FIG. 2 is a sequence diagram describing an exemplary operation that creates a map in the radio communication system shown in FIG. 1.

This exemplary operation is an example in which while Femto base station 10-1 and mobile station 20 are communicating with each other, Femto base station 10-1 detects that Femto base station 10-2 has become an interference source and this triggers each of Femto base stations 10-1 and 10-2 to record information in the map provided in their own Femto base station.

Referring to FIG. 2, control unit 13 of Femto base station 10-1 determines whether or not an uplink radio signal received from mobile station 20 in its own cell contains an interference signal at step A1.

Control unit 13 of Femto base station 10-1 determines whether or not the radio signal contains an interference signal, for example, based on the SIR (Signal to Interference power Ratio), the BLER (BLock Error Rate), the Ec/NO (Received energy per chip divided by the power density in the band), the RTWP (Received Total Wideband Power), the number of cell update times, the number of call loss times, the number of packet retransmission times, and so forth.

As a specific exemplary method in which control unit 13 of Femto base station 10-1 determines whether or not a radio signal contains an interference signal, it can be contemplated that assuming that control unit 13 measures the SIR value as the interference amount, if the SIR value is equal to or lower than a predetermined threshold, control unit 13 determines that the radio signal contains an interference signal; however, the present invention is not limited to such an exemplary method.

If the radio signal contains an interference signal, control unit 13 of Femto base station 10-1 detects the IP address and port number of the sender from the interference signal at step A2. In this example, it is assumed that the detected IP address and port number are those that have been assigned to Femto base station 10-2.

Thus, control unit 13 of Femto base station 10-1 transmits a message containing information of communication parameters (IP address, port number, frequency, spread code (scrambling code and channelizing codes) of each of its own Femto base station and Femto base stations that have been recorded in the map and that have been detected by the own Femto base station.

When control unit 13 of Femto base station 10-2 receives the message from Femto base station 10-1, control unit 13 detects the IP address and port number of the sender from the message at step A3. In this example, the detected IP address and port number are those that have been assigned to Femto base station 10-1.

Thus, control unit 13 of Femto base station 10-2 transmits the message containing information of communication parameters (IP address, port number, frequency, and spread code) of each of its own Femto base station and Femto base stations that have been detected by the own Femto base station and that have been recorded in the map.

Control unit 13 of each of Femto base stations 10-1 and 10-2 records the information of the communication parameters (IP address, port number, frequency, and spread code) of each of the other Femto base stations received at steps A3 and A2 in the map stored in storage unit 12 at steps A4 and A5, respectively. An exemplary map provided in Femto base station 10-1 is shown in Table 1. In Table 1, the flag represents Femto base stations that its own Femto base station have detected.

TABLE 1

| Base station | Flag | Frequency | Spread code | IP address | Port number |
| --- | --- | --- | --- | --- | --- |
| Base station #2 | 1 | X | A | α | α' |
| Base station #3 | 0 | Y | B | β | β' |
| Base station #4 | 0 | Z | C | γ | γ' |
| ... | ... | ... | ... | ... | ... |

Thus, in this exemplary operation, the communication parameters of Femto base stations (neighboring base stations)

that its own Femto base station has detected and Femto base stations (Femto base stations that neighbor the neighboring base stations) that the Femto base station has detected can be recorded as communication parameters of the neighboring base stations in the maps provided in Femto base stations 10-1 and 10-2.

(1-2) Example 2 of Map Creating Operation

Figure 3:
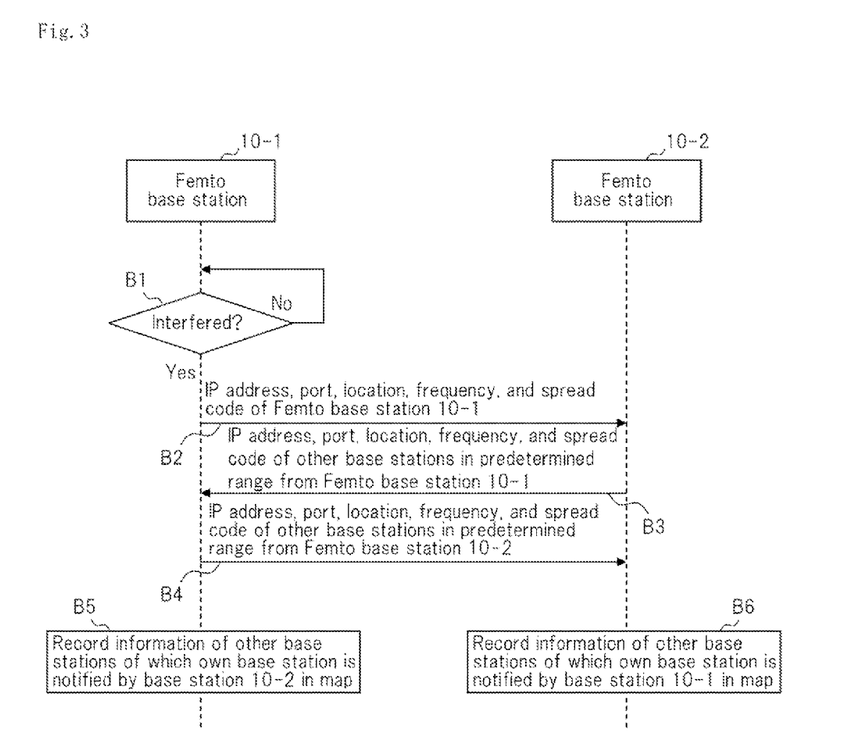
FIG. 3 is a sequence diagram describing another exemplary operation that creates a map in the radio communication system shown in FIG. 1.

This exemplary operation is another example in which while Femto base station 10-1 and mobile station 20 are communicating with each other, Femto base station 10-1 detects that Femto base station 10-2 becomes an interference source and this triggers Femto base stations 10-1 and 10-2 to record information in the map provided in their own Femto base station.

Referring to FIG. 3, control unit 13 of Femto base station 10-1 determines whether or not an uplink radio signal received from mobile station 20 that is present in the own cell contains an interference signal at step B1.

Control unit 13 of Femto base station 10-1 determines whether or not the radio signal contains an interference signal, for example, based on the SIR, the BLER, the Ec/NO, the RTWP, the number of cell update times, the number of call loss times, the number of packet retransmission times, and so forth.

If the radio signal contains an interference signal, control unit 13 of Femto base station 10-1 detects the IP address and port number of the sender from the interference signal at step B2. In this example, it is assumed that the detected IP address and port number are those assigned to Femto base station 10-2.

Thus, control unit 13 of Femto base station 10-1 transmits a message containing information of communication parameters (IP address, port number, location, frequency, and spread code) of its own Femto base station to Femto base station 10-2.

Although the location information is assumed to be information of the latitude and longitude obtained from the GPS (Global Positioning System), if a radio wave cannot be received from GPS satellites, the location information may be information of the IP address, the neighboring cell information, the cell ID, or the like instead of such information.

When control unit 13 of Femto base station 10-2 receives the message from Femto base station 10-1, control unit 13 detects the IP address and port number of the sender from the message at step B3. In this example, the detected IP address and port number are those that have been assigned to Femto base station 10-1.

Thus, control unit 13 of Femto base station 10-2 identifies other Femto base stations that are present in a predetermined range from Femto base station 10-1 based on the location information of Femto base station 10-1 and that of other Femto base stations that have been recorded in the map. In addition, control unit 13 of Femto base station 10-2 transmits a message containing information of communication parameters (IP address, port number, location, frequency, and spread code) of each of its own Femto base station and the identified other Femto base stations to Femto base station 10-1. At this point, if its own Femto base station is not present in the predetermined range from Femto base station 10-1, control unit 13 of Femto base station 10-2 does not need to transmit information of communication parameters of its own Femto base station to Femto base station 10-1.

Then, control unit 13 of Femto base station 10-1 identifies other Femto base stations that are present in the predetermined range from Femto base station 10-2 based on the location information of Femto base station 10-2 and the location information of other Femto base stations that have been recorded in the map at step B4. Then, control unit 13 of Femto base station 10-1 transmits a message containing information of communication parameters (IP address, port number, location, frequency, and spread code) each of the identified other Femto base stations to Femto base station 10-2.

Then, control unit 13 of each of Femto base stations 10-1 and 10-2 records the information of communication parameters (IP address, port number, location, frequency, and spread code) of each of the other Femto base stations that are present in the predetermined range from its own Femto base station of the information received at steps B3, B2, and B4 in the map stored in storage unit 12 at steps B5 and B6. An exemplary map provided in Femto base station 10-1 is shown in Table 2.

TABLE 2

| Base station | Frequency | Spread code | Location information (latitude) | Location information (longitude) | IP address | Port number |
|---|---|---|---|---|---|---|
| Base station #2 | X | A | a | a' | α | α' |
| Base station #3 | Y | B | b | b' | β | β' |
| Base station #4 | Z | C | c | c' | γ | γ' |
| ... | ... | ... | ... | ... | ... | ... |

Thus, in this exemplary operation, communication parameters of other Femto base stations that are present in the predetermined range from the own Femto base station can be recorded as communication parameters of neighboring base stations in the respective maps provided in Femto base stations 10-1 and 10-2.

(1-3) Example 3 of Map Creating Operation

Figure 4:
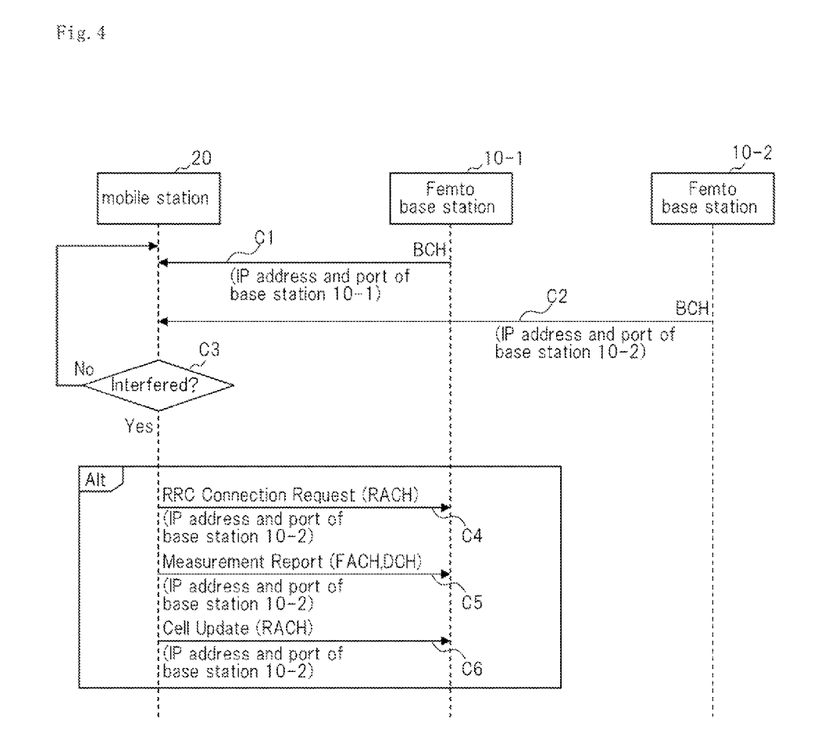
FIG. 4 is a sequence diagram describing a further exemplary operation that creates a map in the radio communication system shown in FIG. 1.

This exemplary operation is an example in which, while Femto base station 10-1 and mobile station 20 are communicating with each other, mobile station 20 detects that Femto base station 10-2 becomes an interference source and this triggers Femto base stations 10-1 and 10-2 to record information in the map provided in their own Femto base station.

Referring to FIG. 4, control unit 23 of mobile station 20 determines whether or not a downlink radio signal received from Femto base station 10-1 contains an interference signal at step C3.

Control unit 23 of mobile station 20 determines whether or not the radio signal contains an interference signal, for example, based on the reception quality of the CPICH (Common Pilot Channel), the reception quality of the DPCH (Dedicated Physical Channel), the reception quality of the P-CCPCH (Primary Common Control Channel), the reception quality of the DTCH (Dedicated Traffic Channels) on the FACH (Forward Access Channel), and so forth.

As specific exemplary methods in which control unit 23 of mobile station 20 determines whether or not the radio signal contains an interference signal, it can be contemplated that assuming that control unit 23 measures the BLER value as the interference amount, if the BLER value is equal to or greater than a predetermined threshold, control unit 23 determines that the radio signal contains an interference signal; and that assuming that the SIR value of the CPICH is an interference amount, if the SIR value is equal to or lower than a predetermined threshold, control unit 23 determines that the radio signal contains an interference signal; however, the present invention is not limited to such exemplary methods.

If the radio signal contains an interference signal, control unit 23 of mobile station 20 detects the IP address and port number of the sender from the interference signal at step C4 (C5 or C6). In this example, it is assumed that the detected IP address and port number are those assigned to Femto base station 10-2. In addition, it is assumed that the IP address and port number assigned to each of Femto base stations 10-1 and 10-2 are obtained from radio signals received through the BCH (Broadcast Channel) at steps C1 and C2, respectively.

Thus, control unit 23 of mobile station 20 notifies Femto base station 10-1 of the IP address and port number of Femto base station 10-2.

At this point, if mobile station 20 remains in the idle state, control unit 23 of mobile station 20 notifies Femto base station 10-1 of the IP address and port number of Femto base station 10-2 by transmitting an RRC Connection Request message that causes Femto base station 10-1 to reestablish the RRC connection for mobile station 20 to Femto base station 10-1 through the RACH (Random Access Channel) at step C4.

If mobile station 20 remains in the Cell_FACH state, control unit 23 of mobile station 20 notifies Femto base station 10-1 of the IP address and port number of Femto base station 10-2 by transmitting a Measurement Report message that reports various types of values measured by mobile station 20 to Femto base station 10-1 through the FACH at step C5. Alternatively, mobile station 20 notifies Femto base station 10-1 of the IP address and port number of Femto base station 10-2 by transmitting a Cell Update message that causes Femto base station 10-1 to reestablish the RRC connection for mobile station 20 through the RACH at step C6.

If mobile station 20 remains in the Cell_DCH state, control unit 23 of mobile station 20 notifies Femto base station 10-1 of the IP address and port number of Femto base station 10-2 by transmitting an Measurement Report message to Femto base station 10-1 through the DCH at step C5.

Alternatively, mobile station 20 may notify Femto base station 10-1 of the IP address and port number of Femto base station 10-2 by transmitting another message to Femto base station 10-1.

The operations that Femto base stations 10-1 and 10-2 perform thereafter therebetween are nearly the same as those performed at step A2 or thereafter shown in FIG. 2 or those performed at step B2 or thereafter shown in FIG. 3.

However, in this exemplary operation, at steps A2 and A3 shown in FIG. 2, Femto base stations 10-1 and 10-2 notify each other of communication parameters of Femto base stations 10 that have been notified by mobile station 20 rather than those of Femto base stations 10 that the own Femto base station has detected.

Thus, in this exemplary operation, even if mobile station 20 detects the IP address and port number of Femto base station 10 that is the sender of an interference signal, communication parameters of neighboring base stations can be recorded in the respective maps of Femto base stations 10-1 and 10-2.

Referring to examples 1 and 2 of the map creating operation, control unit 13 of each of Femto base stations 10-1 and 10-2 may encrypt communication parameters according to a predetermined encryption format that has been designated by Femto base stations 10-1 and 10-2, notify each other of the encrypted communication parameters, decrypt them, and obtain the communication parameters.

Referring to example 3 of the map creating operation, control unit 13 of each of Femto base stations 10-1 and 10-2 may encrypt information of the IP address and port number of their own Femto base station according to their predetermined encryption format, control unit 23 of mobile station 20 may transfer the encrypted IP address and port number of the sender of an interference signal to Femto base station 10-1, and then control unit 13 of Femto base station 10-1 may decrypt the information of the IP address transmitted from mobile station 20 and obtain the information of the IP address.

(2) Operation that Changes Communication Parameters

Figure 5:
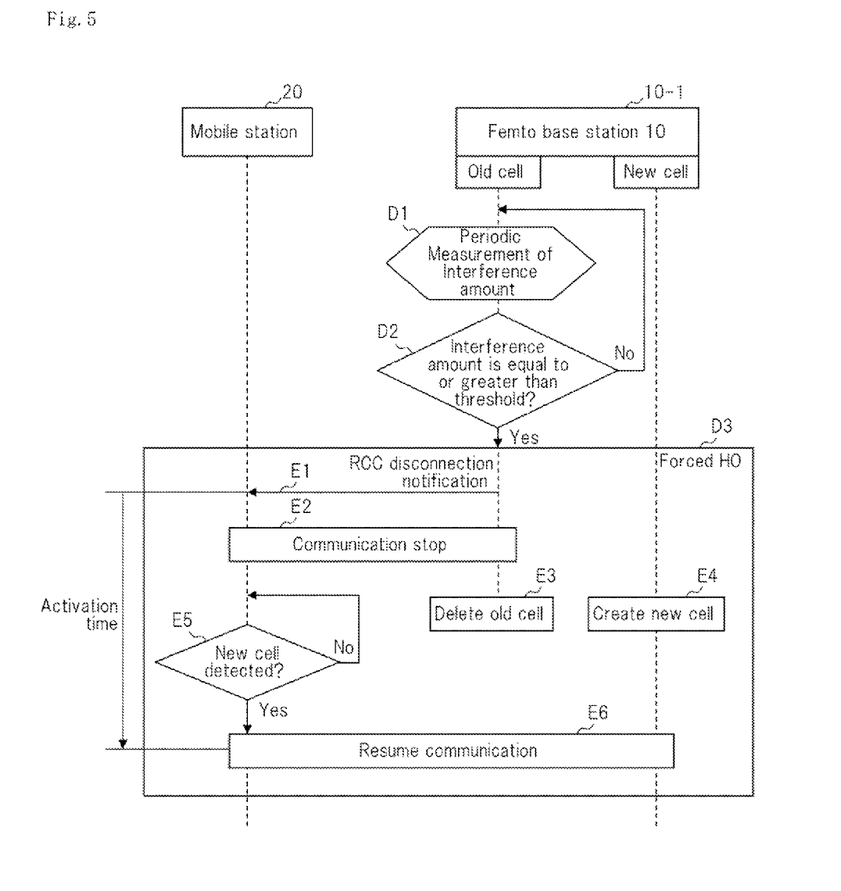
FIG. 5 is a sequence diagram describing an exemplary operation that changes communication parameters of a base station in the radio communication system shown in FIG. 1.

If the interference amount of an interference signal contained in a radio signal by which Femto base stations 10-1~10-N are communicating with mobile station 20 becomes equal to or greater than a predetermined threshold, and if a preset time expires, or if a time designated by negotiation with neighboring base stations expires, each of Femto base stations 10-1~10-N will change communication parameters based on the map created in the forgoing manner.

In this example, the operation that changes communication parameters if the interference amount becomes equal to or greater than the predetermined threshold in Femto base station 10-1 will be described.

Referring to FIG. 5, control unit 13 of Femto base station 10-1 periodically measures the interference amount of an interference signal contained in an uplink radio signal received from mobile station 20 at step D1.

Control unit 13 of Femto base station 10-1 measures the interference amount, for example, based on the SIR, the BLER, the Ec/NO, the RTWP, the number of cell update times, the number of call loss times, the number of packet retransmission times, and so forth.

As a specific exemplary method in which control unit 13 of Femto base station 10-1 measures the interference amount, although it can be contemplated that control unit 13 may measure the SIR value as the interference amount, the present invention is not limited to such an exemplary method.

This measurement is not limited to the case in which Femto base station 10-1 measures an uplink radio signal; instead, a single or a plurality of mobile stations 20 may measure a downlink radio signal and report the measurement result to Femto base station 10-1.

In this case, a single or a plurality of mobile stations 20 may be selected according to any method such as a method based on a predetermined IMSI (International Mobile Subscriber Identify). Alternatively, Femto base station 10-1 may select all mobile stations 20 that are present in its own cell.

Moreover, in this case, control unit 23 of mobile station 20 measures the interference amount based on the reception quality of the CPICH, the reception quality of the DPCH, the reception quality of the P-CCPCH, and so forth.

As other specific exemplary methods in which control unit 23 of mobile station 20 measures the interference amount, although it can be contemplated that control unit 23 measures the BLER value or the SIR value of the CPICH as the interference amount, the present invention is not limited to such exemplary methods.

If control unit 13 of Femto base station 10-1 determines that the interference amount is equal to or greater than the predetermined threshold at step D2, control unit 13 creates a new cell in which communication parameters are changed based on the map and performs a forced handover (HO) process that forcedly hands over mobile station 20 that is present in the old cell and that remains in the Connected Mode (that has established the RRC connection with the own Femto base station) to the new cell at step D3.

The threshold of the interference amount triggered to change communication parameters at step D2 is equal to or greater than the threshold of the interference amount in which it is determined that the radio signal contains an interference signal at step A1 shown in FIG. 2.

It is contemplated that the communication parameters can be changed in the following methods.

As methods that change communication parameters, the following methods can be contemplated.

(a) Other relevant Femto base stations are identified from those that have been recorded in the map. For example, all other Femto base stations recorded in the map, other Femto base stations that are present in a predetermined range from its own Femto base station in the case that the latitude and longitude have been recorded as location information (Table 2), or other Femto base stations having the same subnet mask if IP addresses have been recorded as location information are identified.

(b) If there is a frequency that has not been used for other relevant Femto base stations, this frequency will be used to change the communication parameters.

(c) If there is no frequency that has not been used in the other Femto base stations, a spread code that has not been used in any of relevant Femto base stations will be used to change the communication parameters.

(d) If there is neither a frequency, nor a spread code that have not been used in any of relevant Femto base stations, a frequency having smaller interference than those used in any of other Femto base stations or a spread code having smaller interference than those used in any of other Femto base stations is used to change the communication parameters.

However, the methods that change communication parameters are not limited to the foregoing ones.

Here, the forced handover process at step D3 will be described in detail.

Referring to FIG. 5, control unit 13 of Femto base station 10-1 transmits an RRC disconnection instruction message (for example, an RRC Connection Release message, or the like) that causes the RRC connection to be disconnected from all mobile stations 20 that remain in the Connection Mode in the old cell at step E1.

At this point, control unit 13 of Femto base station 10-1 notifies mobile stations 20 of the following communication parameters that are necessary to connect mobile stations 20 to the new cell, the communication parameters being contained in the RRC disconnection instruction message.

the frequency of the new cell
the channel type of the new cell
the service information of the new cell (MIMO (Multiple Input Multiple Output), HSPA (High Speed Packet Access), or the like)
the downlink rate/uplink rate of the new cell
the scrambling code of the new cell
the channelization code of the new cell Alternatively, control unit 13 of Femto base station 10-1 may notify mobile stations 20 of the following communication parameters.

the RNTI (Radio Network Temporary Identity)
the information of Ciphering
the information of MBMS (Multimedia Broadcast Multicast Service). For example, the information that relates to the MICH (MBMS Indicator Channel) for the MBMS, the MCCH (MBMS Control Channel), and the MTCH (MBMS Traffic Channel) (information of spread code, information of SAI (Service Area Identification), and so forth), and time information such as Activation Time necessary for resumption of transmission of MBMS data.

When control unit 23 of mobile station 20 receives the RRC disconnection instruction message from Femto base station 10-1, control unit 23 disconnects the RRC connection at step E2. Thus, radio communication stops between mobile station 20 and Femto base station 10-1.

Thereafter, control unit 13 of Femto base station 10-1 deletes the old cell and creates a new cell in which communication parameters of the old cell are changed so as to reconstruct a cell at step E3 and E4.

When control unit 23 of mobile station 20 detects a new cell at step E5, control unit 23 establishes the RRC connection in the new cell using the communication parameters of the RRC disconnection instruction message of which control unit 23 has been notified by Femto base station 10-1 and resumes the radio communication with Femto base station 10-1 through the new cell after an elapse of an Activation Time at step E6.

Figure 6:
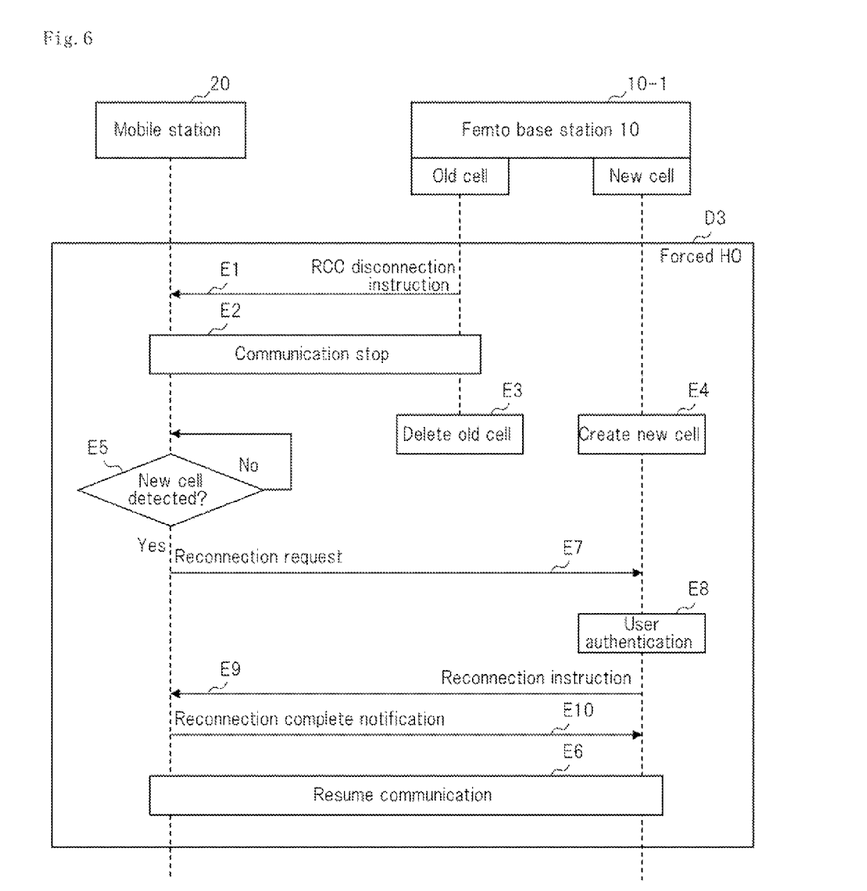
FIG. 6 is a sequence diagram describing an exemplary modification of a forced handover process shown in FIG. 5.

In the foregoing handover process at step D3, as option, a user authentication can also be performed. User authentication can be used so as to prevent mobile station 20 from taking over the traffic. Here, with reference to FIG. 6, the process performed for the user authentication will be described. In FIG. 6, similar portions to those in FIG. 5 are denoted by similar reference numerals.

Referring to FIG. 6, when control unit 13 of Femto base station 10-1 transmits the RRC disconnection instruction message to all mobile stations 20 that are present in the old cell and that remain in the Connected Mode at step E, control unit 13 issues a certificate to them. At this point, control unit 13 does not need to notify mobile stations 20 of an Activation Time.

When control unit 23 of mobile station 20 receives the certificate from Femto base station 10-1, control unit 23 detects a new cell at step E5 and transmits a reconnection request message that includes the certificate and that requests Femto base station 10-1 to reestablish the RRC connection (for example, an RRC Connection Request message, a Cell Update message, or the like) to Femto base station 10-1 at step E7.

When control unit 13 of Femto base station 10-1 receives the reconnection request message including the certificate from mobile station 20, control unit 13 authenticates mobile station 20 based on the certificate at step E8 and after authenticating mobile station 20, control unit 13 transmits a reconnection instruction message that causes mobile station 20 to reestablish the RRC connection (for example, an RRC Connection Setup message, a Cell Update Confirm message, or the like) to mobile station 20 at step E9. At this point, although control unit 13 notifies mobile station 20 of communication parameters contained in the reconnection instruction message, communication parameters contained in the RRC disconnection request message which has been notified to mobile station 20 can be omitted.

When control unit 23 of mobile station 20 receives the reconnection instruction message from Femto base station 10-1, control unit 23 transmits a reconnection completion notification message, of which Femto base station 10-1 is notified that the reestablishment of the RRC connection has been completed (for example, an RRC Connection Setup Complete message, an RB Setup Complete message, a Transport Channel Reconfiguration Complete message, or the like), to Femto base station 10-1 at step E10 and resumes the radio communication with Femto base station 10-1 through the new cell at step E6.

In FIG. 6, if control unit 13 of Femto base station 10-1 is notified of the IMSI or TMSI (Temporary Mobile Subscriber Identify) by mobile station 20, control unit 13 can omit the process that issues the certificate at step E1.

Figure 7:
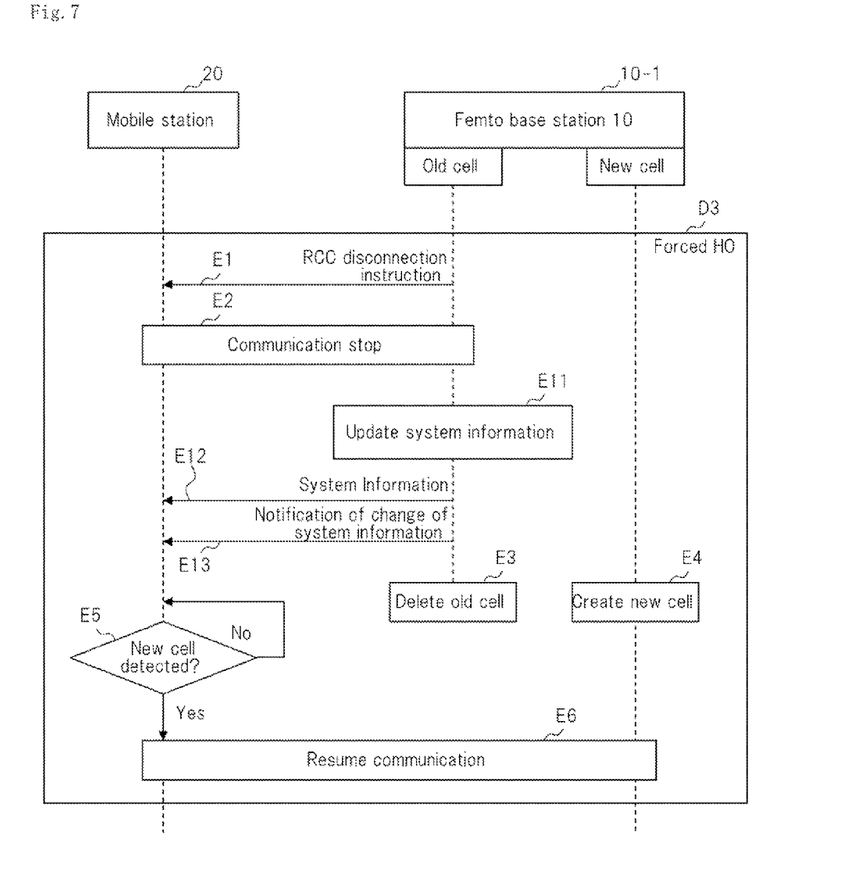
FIG. 7 is a sequence diagram describing another exemplary modification of the forced handover process shown in FIG. 5.

In the forced handover process at step D3, as an option, the SI (System Information) can be updated so as to instruct mobile stations 20 that are present in the old cell and that remain in other than the Connected Mode to enter the new cell. Here, with reference to FIG. 7, the process performed in this case will be described. In FIG. 7, similar portions to those in FIG. 5 are denoted by similar reference numerals.

Referring to FIG. 7, control unit 13 of Femto base station 10-1 updates information of the frequency of the new cell, the MICH, the S-CCPCH (Secondary Common Control Physical Channel), the FACH, the PCH (Paging Channel), the MCCH, the MTCH, the scrambling code (PCT (Physical Cell ID) in the case of the LTE), and so forth contained in the SI at step E11 and delivers the updated SI to mobile station 20 at step E12.

A plurality of candidate frequencies for the new cell can be contained in the SI. In addition, the plurality of candidate frequencies can be prioritized. On the other hand, only the frequency of the new cell may be contained in the SI so as to cause mobile stations 20 that remain in the Connected Mode to enter the new cell.

Thereafter, control unit 13 of Femto base station 10-1 transmits a System Information Change Indication message to mobile stations 20 that remain in the Cell_FACH state or in the Cell_PCH state of those that remain in other than the Connected Mode at step E13 so as to notify them that the SI has been changed.

As described above, according to this embodiment, each of Femto base stations 10-1~10-N detects the IP address of a Femto base station that is the sender of an interference signal contained in a radio signal received from mobile station 20 with which each of Femto base stations 10-1~10-N is communicating.

Alternatively, mobile station 20 detects the IP address of Femto base station 10 that is the sender of an interference signal contained in a radio signal received from Femto base station 10 with which mobile station 20 is communicating and notifies communicating Femto base station 10 of the IP address.

Thus, an effect in which each of Femto base stations 10-1~10-N can detect Femto base station 10 that is the sender of an interfere signal, namely 'neighboring Femto base stations 10, not through a highly hierarchical station is obtained.

Moreover, according to this embodiment, each of Femto base stations 10-1~10-N and a Femto base station that is the sender of an interference signal notify each other of communication parameters of their own Femto base station and neighboring Femto base stations based on the IP address of Femto base station 10 that is the sender of the interference signal.

Thus, an effect, in which each of Femto base stations 10-1~10-N can detect communication parameters of neighboring Femto base stations 10 but not through a highly hierarchical station and thus knows communication parameters that have small interference, is obtained.

In addition, according to this embodiment, if Femto base stations 10-1~10-N each reconstruct a cell, they will notify mobile stations 20 that are present in the non-reconstructed old cell of communication parameters of the reconstructed new cell.

Thus, an effect, in which when Femto base station 10 reconstructs a cell, mobile station 20 can smoothly start communication with the new cell, is obtained.

Now, with reference to the embodiments, the present invention has been described. However, it should be understood by those skilled in the art that the structure and details of the present invention may be changed in various manners without departing from the scope of the present invention.

For example, a method that is performed in Femto base stations 10-1~10-N and mobile station 20 may be applied to a program that causes a computer to execute the method. The program may be stored in a storage medium and also may be provided to the outside through a network.

The present application claim priority based on Japanese Patent Application JP 2009-062587 filed on Mar. 16, 2009, the entire contents of which are incorporated herein by reference in its entirety.

The invention claimed is:

1. A radio communication system having a mobile station and a plurality of base stations each of which communicates by a radio signal with a mobile station that is present in a cell of each base station,
    wherein each of said plurality of base stations has base station side control unit that detects an IP address of a base station that is a sender of an interference signal from the radio signal if the radio signal received from a mobile station with which the base station of the cell of the mobile station is communicating contains the interference signal, the IP address having been set to the interference signal,
    wherein said base station side control unit of a first base station of said
    plurality of base stations transmits a communication parameter to a second base station of said plurality of base stations that is the sender of the interference signal, and receives a communication parameter of the second base station from the second base station, based on said detected IP address,
    wherein said base station side control unit of each base station encrypts the communication parameters, notifies every other base station of said encrypted communication parameters, decrypts the communication parameters received from every other base station, and obtains the communication parameters.

2. The radio communication system as set forth in claim 1, wherein said base station side control unit notifies the base station that is the sender of the interference signal each other of communication parameters of base stations that the base station of said base station side control unit has detected IP addresses therefrom.

3. The radio communication system as set forth in claim 2, wherein said base station side control unit creates a map that shows the communication parameters concerning which the base station that is the sender of the interference signal notifies the base station of said base station side control unit.

4. The radio communication system as set forth in claim 3, wherein said base station side control unit changes the communication parameters of the base station of said base station side control unit and reconstructs a cell based on said map at a predetermined timing.

5. The radio communication system as set forth in claim 4, wherein if said base station side control unit reconstructs the cell, said base station side control unit notifies a mobile station that is present in a pre-reconstructed old cell of communication parameters of a reconstructed new cell.

6. The radio communication system as set forth in claim 5, wherein said base station side control unit notifies said mobile station of a plurality of candidate frequencies as the communication parameters of the reconstructed new cell and priority order of said plurality of candidate frequencies.

7. The radio communication system as set forth in claim 5, wherein said base station side control unit notifies said mobile station of information of the Multimedia Broadcast Multicast Service (MBMS) as communication parameters of the reconstructed new cell.

8. The radio communication system as set forth in claim 1, wherein said base station side control unit causes location information to be contained in the communication parameters concerning which the base station of said base station side control unit and the base station that is the sender of the interference signal notify each other, and wherein the base station of said base station side control unit notifies the base station that is the sender of the interference signal each other of communication parameters of base stations that are present in a predetermined range from the base station.

9. A radio communication system having a mobile station and a plurality of base stations that communicate by a radio signal with a mobile station that is present in a cell of each base station, wherein said mobile station has mobile station side control unit that detects an IP address of a base station that is a sender of an interference signal from the radio signal if the radio signal received from a base station with which the mobile station is communicating contains the interference signal, the IP address having been set to the interference signal, and that transmits information of the detected IP address to the base station with which the mobile station is communicating, and wherein each of said plurality of base stations has base station side control unit that receives the information of the IP address of the base station that is the sender of the interference signal, the information being transmitted from the mobile station with which each of the plurality of base stations is communicating, wherein said base station side control unit encrypts the IP address of the base station of said base station side control unit, the IP address being set to the radio signal, wherein said mobile station side control unit transfers information of the encrypted IP address of the base station that is the sender of the interference signal to the base station with which the mobile station is communicating, and wherein said base station side control unit receives the information of the encrypted IP address of the base station that is the sender of the interference signal, decrypts the information of the encrypted IP address, and obtains the IP address.

10. The radio communication system as set forth in claim 9, wherein said base station side control unit notifies the base station that is the sender of the interference signal each other of communication parameters of the base station of said base station side control unit based on said detected IP address.

11. The radio communication system as set forth in claim 10, wherein said base station side control unit notifies the base station that is the sender of the interference signal each other of communication parameters of base stations that the base station of said base station side control unit has detected IP addresses therefrom.

12. A base station that communicates by a radio signal with a mobile station that is present in a cell of the base station, comprising:

base station side control unit that detects an IP address of a different base station that is a sender of an interference signal from the radio signal if the radio signal received from a mobile station with which the base station is communicating contains the interference signal, the IP address having been set to the interference signal, wherein said base station side control unit transmits a communication parameter to the different base station, and receives a communication parameter of the different base station from the different base station, based on said detected IP address, wherein said base station side control unit encrypts the communication parameters, notifies the different base station of said encrypted communication parameters, decrypts different communication parameters received from the different base station, and obtain the communication parameters; and a communication unit that transmits and receives information to and from the mobile station and the different base station.

13. The base station as set forth in claim 12, wherein said base station side control unit notifies the base station that is the sender of the interference signal each other of communication parameters of base stations that the base station of said base station side control unit has detected IP addresses therefrom.

14. The base station as set forth in claim 13, wherein said base station side control unit creates a map that shows the communication parameters concerning which the base station that is the sender of the interference signal notifies the base station of said base station side control unit.

15. The base station as set forth in claim 14, wherein said base station side control unit changes the communication parameters of the base station of said base station side control unit and reconstructs a cell based on said map at a predetermined timing.

16. The base station as set forth in claim 15, wherein if said base station side control unit reconstructs the cell, said base station side control unit notifies a mobile station that is present in a pre-reconstructed old cell of communication parameters of a reconstructed new cell.

17. The base station as set forth in claim 16, wherein said base station side control unit notifies said mobile station of a plurality of candidate frequencies as the communication parameters of the reconstructed new cell and the priority order of said plurality of candidate frequencies.

18. The base station as set forth in claim 16, wherein said base station side control unit notifies said mobile station of information of the Multimedia Broadcast Multicast Service (MBMS) as communication parameters of the reconstructed new cell.

19. The base station as set forth in claim 12, wherein said base station side control unit encrypts the communication parameters, notifies another base station each other of the encrypted communication parameters, decrypts the communication parameters of which the other base station notifies, and obtains the communication parameters.

20. The base station as set forth in claim 12, wherein said base station side control unit causes location information to be contained in the communication parameters concerning which the base station of said base station side control unit and the base station that is the sender of the interference signal notify each other, and wherein the base station of said base station side control unit notifies the base station that is the sender of the interference signal each other of communication parameters of base stations that are present in a predetermined range from the base station.

21. A base station that communicates by a radio signal with a mobile station that is present in a cell of own base station, comprising:
   base station side control unit that receives information of an IP address of a different base station that is a sender of an interference signal from the mobile station with which the base station is communicating if the radio signal transmitted to the mobile station with which the base station is communicating contains the interference signal,
   wherein said base station side control unit transmits a communication parameter to the different base station, and receives a communication parameter of the different base station from the different base station, based on said detected IP address,
   wherein said base station side control unit encrypts the communication parameters, notifies the different base station of said encrypted communication parameters, decrypts different communication parameters received from the different base station, and obtain the communication parameters; and
   a communication unit that transmits and receives information to and from the mobile station and the different base station.

22. The base station as set forth in claim 21,
   wherein said base station side control unit receives information of encrypted IP address of the base station that is the sender of the interference signal, the information being transmitted from the mobile station with which the base station of the cell of the mobile station is communicating, decrypts the information of the encrypted IP address, and obtains the IP address.

23. The base station as set forth in claim 22,
   wherein said base station side control unit notifies the base station that is the sender of the interference signal each other of communication parameters of the base stations that have received information of the IP addresses from the mobile station.

24. A mobile station that communicates by a radio signal with a base station, comprising:
   mobile station side control unit that detects an IP address of a first base station that is a sender of an interference signal from the radio signal if the radio signal received from a second base station with which the mobile station is communicating contains the interference signal, the IP address having been set to the interference signal, and that transmits information of the detected IP address to the second base station with which the mobile station is communicating,
   wherein said first base station encrypts the IP address, the IP address being set to the radio signal,
   wherein said mobile station side control unit transfers information of the encrypted IP address of the first base station to the second base station,
   wherein said second base station receives the information of the encrypted IP address of the first base station, decrypts the information of the encrypted IP address, and obtains the IP address; and
   a communication unit that transmits and receives information to and from the first base station and the second base station.

25. The mobile station as set forth in claim 24,
   wherein said mobile station side control unit transfers information of the encrypted IP address of the base station that is the sender of the interference signal to the base station with which the mobile station is communicating.

26. A radio communication method of a radio communication system having a mobile station and a plurality of base stations each of which communicates by a radio signal with a mobile station that is present in a cell of each base station, comprising the step of
   detecting an IP address of a first base station that is a sender of an interference signal from the radio signal if the radio signal received from a mobile station with which a second base station of the cell of said mobile station is communicating contains the interference signal, the IP address having been set to the interference signal,
   wherein the method further comprises:
   said first base station encrypting the IP address, the IP address being set to the radio signal;
   said mobile station side transferring information of the encrypted IP address of the first base station to the second base station; and
   said second base station receiving the information of the encrypted IP address of the first base station, decrypts the information of the encrypted IP address, and obtaining the IP address.

27. A radio communication method of a radio communication system having a mobile station and a plurality of base stations that communicate by a radio signal with a mobile station that is present in a cell of each base station, comprising the steps of:
   detecting an IP address of a first base station that is a sender of an interference signal from the radio signal if the radio signal received from a second base station with which the mobile station is communicating contains the interference signal, the IP address having been set to the interference signal, and transmitting information of the detected IP address to the second base station with which the mobile station is communicating, and
   receiving the information of the IP address of the first base station, the information being transmitted from the mobile station with which each of the plurality of base stations is communicating,
   wherein the method further comprises:
   said first base station encrypting the IP address, the IP address being set to the radio signal;
   said mobile station side control unit transferring information of the encrypted IP address of the first base station to the second base station; and
   said second base station receiving the information of the encrypted IP address of the first base station, decrypts the information of the encrypted IP address, and obtaining the IP address.

28. A radio communication method of a base station that communicates by a radio signal with a mobile station that is present in a cell of a base station of the cell of the mobile station, comprising the step of:
   detecting an IP address of a first base station that is a sender of an interference signal from the radio signal if the radio signal received from a mobile station with which the first base station is communicating contains the interference signal, the IP address having been set to the interference signal,
   wherein the method further comprises:
   said first base station encrypting the IP address, the IP address being set to the radio signal;

said mobile station side control unit transferring information of the encrypted IP address of the first base station to a second base station; and said second base station receiving the information of the encrypted IP address of the first base station, decrypts the information of the encrypted IP address, and obtaining the IP address.

29. A radio communication method of a base station that communicates by a radio signal with a mobile station that is present in a cell of the cell of the mobile station, comprising the step of:

receiving information of an IP address of a first base station that is a sender of an interference signal from the mobile station with which the first base station is communicating if the radio signal transmitted to the mobile station with which the first base station is communicating contains the interference signal, wherein the method further comprises:

said first base station encrypting the IP address, the IP address being set to the radio signal;

said mobile station side control unit transferring information of the encrypted IP address of the first base station to a second base station; and said second base station receiving the information of the encrypted IP address of the first base station, decrypts the information of the encrypted IP address, and obtaining the IP address.

30. A radio communication method of a mobile station that communicates by a radio signal with a base station, comprising the step of:

detecting an IP address of a first base station that is a sender of an interference signal from the radio signal if the radio signal received from a second base station with which the mobile station is communicating contains the interference signal, the IP address having been set to the interference signal, and transmitting information of the detected IP address to the second base station with which the mobile station is communicating, wherein the method further comprises:

said first base station encrypts the IP address, the IP address being set to the radio signal;

said mobile station side control unit transferring information of the encrypted IP address of the first base station to the second base station; and said second base station receiving the information of the encrypted IP address of the first base station, decrypts the information of the encrypted IP address, and obtaining the IP address.

* * * * *